Sept. 11, 1923.
C. A. DUNSETH ET AL
1,467,895
COMBINED GARBAGE CAN AND FLYTRAP
Filed July 31, 1922
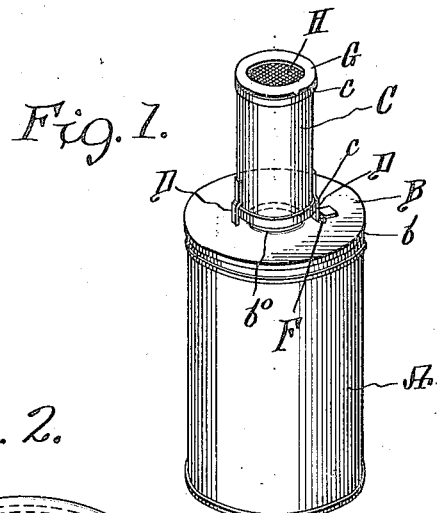
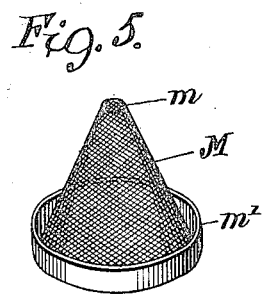
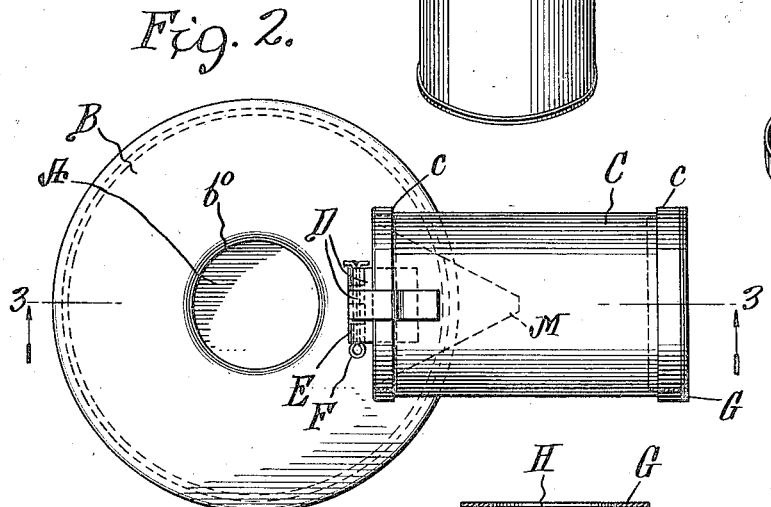
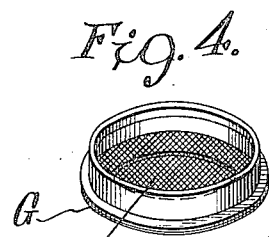
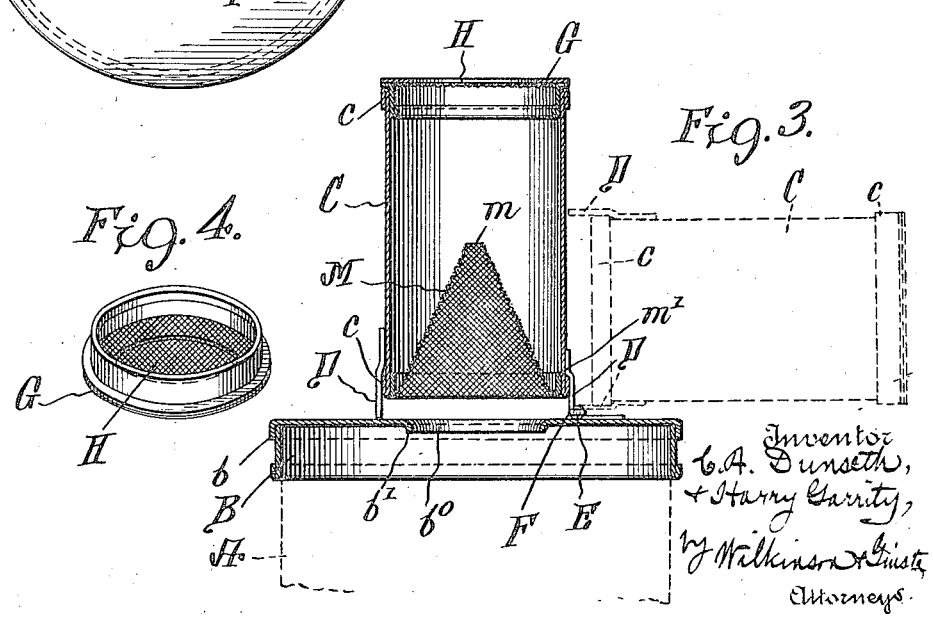

Patented Sept. 11, 1923.

1,467,895

UNITED STATES PATENT OFFICE.

CLIFFORD A. DUNSETH AND HARRY GARRITY, OF ALBERT LEA, MINNESOTA.

COMBINED GARBAGE CAN AND FLYTRAP.

Application filed July 31, 1922. Serial No. 578,765.

*To all whom it may concern:*

Be it known that we, CLIFFORD A. DUNSETH and HARRY GARRITY, citizens of the United States, both residing at Albert Lea, in the county of Freeborn and State of Minnesota, have invented certain new and useful Improvements in Combined Garbage Cans and Flytraps, of which the following is a specification.

This invention relates to an arrangement for trapping and destroying flies, which consist in providing a trap adapted to be placed at the top of a grabage can or similar device to which the flies are normally attracted. It is well known that flies are especially attracted by odors of decomposing matter, such as ordinarily emanate from a garbage can.

This invention is intended to provide a convenient attachment for such a receptacle by which the flies may be trapped, and whereby the receptacle containing the trapped flies may be readily removed and the trapped flies destroyed by drowning or otherwise, and the trap reset.

The invention will be more fully understood after reference to the accompanying drawings, in which like parts are indicated by similar reference symbols throughout the several views, and in which:—

Figure 1 is a prespective view of the complete device showing the garbage can with the trap attached thereto in the normal or set position.

Figure 2 is a plan view of the top of the garbage can showing the fly trap swung out of the way to show the opening in the top of the can, the parts being shown on a larger scale than in Fig. 1.

Figure 3 shows a section through the garbage can along the line 3—3 of Fig. 2, but with the fly trap shown in full lines in the set position as shown in Fig. 1, and swung down in the dotted position shown in Fig. 2.

Figure 4 is a detail showing the removable cap for the fly trap; and

Figure 5 is a perspective view of the foraminous cone bottom of the fly trap.

A represents the main body of the garbage can which is preferably in the usual cylindrical form, and is provided with a top or cover B, flanged downwards as at $b$, which cover is preferably provided with a central opening $b°$ which may be preferably flanged downwards, as at $b'$, to add stiffness to the same.

C represents the cylindrical shell forming the outer wall of the fly trap, which shell is preferably reinforced top and bottom, as at $c$. The bottom is provided with supporting legs D which are long enough to support the bottom of the shell C above the top B of the can, as shown most clearly in Figs. 1 and 3.

One of the supporting legs D is hinged, as at E, to the top of the garbage can, and the joint of the hinge may be conveniently made with a removable cotter pin F so that the fly trap may be conveniently removed from the top of the garbage can if desired.

The top of the cylindrical shell C is closed by the removable cap G, having the wire diaphragm H. The bottom of the container is provided with an upwardly projecting truncated cone M, opening at its apex $m$ and provided with the ring $m'$ fitting tightly in the container C, or this ring may be soldered or secured in place in the container if desired.

The operation of the device is as follows:

Assuming more or less garbage to be contained in the can A, and the parts to be in the position shown in Fig. 1, the flies will be attracted by the odor arising through the opening $b°$ and, flying to the edge of said opening, will climb up on the underside of the cone M, following the usual tendency of the insect to move towards the light. After passing through the opening $m$, the flies will be caught in the container C and this container may be either separately removed, and the flies drowned in water, or the whole top of the can may be removed and immersed in water. After the flies have been drowned or otherwise destroyed, the cover C may be removed and the interior of the container C cleaned out and the parts reset as desired.

It will be seen that the opening $b°$ in the cover B will provide a convenient means for inserting the hand and removing the cover when desired, and also replacing same to the desired position.

It will be also seen that if it be desired for any purpose to close the can, a piece of board, pasteboard, paper, or the like may be placed over the opening $b°$ beneath the receptacle C, which receptacle will act as a weight to keep the said closing device in place.

Having thus described our invention what we claim and desire to secure by Letters Patent of the United States is:—

The combination with a garbage can, of a detachable cover therefor, provided with a central circular opening therein, a cylindrical receptacle provided with spacing legs mounted on said cover and superposed over said opening but spaced from the perimeter thereof by said legs, a separable hinge detachably connecting said receptacle to said cover, a detachable screen in the form of a hollow truncated cone, open at the top, normally closing the bottom of said receptacle, and a detachable cap provided with a foraminous central portion normally covering the top of said receptacle, substantially as and for the purposes described.

CLIFFORD A. DUNSETH.
HARRY GARRITY.